UNITED STATES PATENT OFFICE.

ARTHUR ARENT, OF DES MOINES, IOWA.

TREATMENT OF MATERIALS TO REDUCE THEIR INFLAMMABILITY.

1,388,826.  Specification of Letters Patent.  Patented Aug. 23, 1921.

No Drawing.  Application filed June 26, 1919. Serial No. 306,928.

*To all whom it may concern:*

Be it known that I, ARTHUR ARENT, a citizen of the United States, residing at Des Moines, in the county of Polk and State of Iowa, have invented certain new and useful Improvements in the Treatment of Materials to Reduce Their Inflammability; and I do hereby declare the following to be a full, clear, and exact description of the invention, such as will enable others skilled in the art to which it appertains to make and use the same.

This invention relates to treatment of materials and especially to treatment to reduce their inflammability; and it relates more particularly to the treatment of tarry materials such as creosote, tar or pitch, asphalt, and the like, by incorporating therewith a fire-retardant metal compound, more particularly a metal compound such as a salt of antimony or the like which is soluble in alcohol, amyl acetate, tetrachlorid or other chlorid of carbon, or other nonaqueous solvent. A metal compound which is insoluble in water and which is decomposed by water with formation of an insoluble compound is particularly desirable for purposes of the present invention.

I have found that materials such as creosote, tar, asphalt, and the like, which are here designated generically as tarry materials, for purposes of convenience, may be rendered highly fire-resistant and substantially non-inflammable by incorporating therewith a fire-retardant metal compound of a class typified by compounds of antimony, anhydrous antimony trichlorid being the most desirable representative of this class of compounds at present known to me. For the sake of a concrete disclosure of the invention, the use of antimony trichlorid will be referred to more particularly hereinafter, but it is to be understood that the invention is not limited to the use of antimony trichlorid, the use of which is here described by way of illustration and not by way of limitation.

The invention comprises the method of treating or fireproofing materials of the general character mentioned, the resultant products, and the combination of such products with materials and articles of manufacture to which said products may be applied.

Tarry materials of the type above mentioned are very widely used in the arts, especially in impregnating or coating wood, paper, textile fabrics, roofing, etc., for the purpose of preserving or waterproofing the same. In their usual untreated condition, such tarry materials inflame readily when heated to a sufficiently high temperature and burn with great vigor. It is a principal object of the present invention to so treat such materials as to greatly reduce their combustibility and to render them substantially non-inflammable, with the result that materials impregnated, coated, or otherwise treated with such materials which have been subjected to the process of the invention will also be noninflammable or substantially so.

Generally speaking, the fire-retardant metal compound employed in practising the present invention may be incorporated directly with the material to be fireproofed, or it may first be dissolved in a suitable solvent vehicle such as carbon tetrachlorid or other carbon chlorid, amyl acetate, or the like, amyl acetate having special advantages for the purposes in view. For example, in fireproofing either crude or refined creosote derived from distillation of either coal or wood, dissolving two pounds of antimony trichlorid in one gallon of creosote renders the latter non-inflammable. That is, after creosote treated in this way has been applied to combustible articles or materials, they can be subjected to the direct impingement of a flame without taking fire, even though the flame be directed into contact with them continuously. The creosote will eventually be decomposed of course and will carbonize but it will not take fire. Solution of antimony chlorid in creosote may be effected at ordinary temperatures without heating, but moderate heating facilitates solution and is therefore desirable in practice.

Materials such as cloth, paper, wood, etc., to which this treated creosote is applied, are rendered very resistant to fire and when thoroughly impregnated or coated with the preparation, they are rendered non-inflammable. The amount of antimony trichlorid employed may vary considerably in accordance with the degree of non-inflammability or resistance to fire which it is desired to attain, but the proportions given in the above specific example are found in this particular case to render the creosote and articles to which such treated creosote is applied, non-inflammable in the sense above explained and to be therefore thoroughly satisfactory.

In fireproofing tar, pitch, or asphalt, of the character commonly employed for roofing, the tar is best melted by gently heating, and when thoroughly liquefied, antimony chlorid is added thereto with continuous stirring. The use of antimony trichlorid in the proportion of one part by weight to four parts of the tar, pitch, or asphalt, yields a fireproof product, that is, a product which will not inflame.

As before stated, the antimony chlorid may first be dissolved in a suitable solvent and then mixed with the material to be fireproofed. For instance, the necessary amount of antimony trichlorid may be dissolved in amyl acetate, and this solution mixed with creosote to give a composition of excellent character for impregnation of paper, canvas, or the like; or the mixture may be used, in conjunction with other materials, such as pigments, varnish gums, etc., if desired, by painting it or otherwise applying it as a coating composition to materials or articles of any kind which it is desired to coat or protect. Similarly the amyl acetate or other solution of antimony trichlorid may be incorporated with semi-solid or solid tars, pitches, and asphalts, to give fireproof paints or coating compositions applicable for numerous purposes. All these mixtures are non-inflammable when antimony trichlorid is present in sufficient quantity, and the degree of non-inflammability or fire-resistance may of course be varied as deemed desirable by varying the proportions of antimony trichlorid used.

The treated products prepared as above described may be applied, when in liquid condition, by brushing, dipping, spraying, etc.; and materials and articles to which such products have been applied are rendered fire-resistant or non-inflammable as already explained and are included within the present invention.

Subjecting articles coated or impregnated with the products above described, to the action of air, and particularly to the action of water, steam or moist air, has the effect of apparently oxidizing the antimony at least in the exposed outer surfaces or layers with formation of highly fire-retardant basic chlorids or oxychlorids of antimony which are insoluble in water and tenaciously adherent, so that the fabric or other article protected with a composition of the character above described does not lose its fire-resistant character even upon exposure to weather. It is for this reason, among others, that metal compounds which act in this respect similarly to anhydrous antimony trichlorid are especially advantageous in practising the present invention. The special desirability of antimony trichlorid is due to the fact that it is readily soluble in a number of organic solvents to give a solution with which materials can be impregnated or otherwise treated, and also to the fact that it does not dissolve in water and hence cannot be washed out of material treated therewith, but on the contrary decomposes instantly upon contact with water, forming insoluble products as above mentioned. Other salts of antimony such as the sulfate are ordinarily less desirable because of the possibility of stronger corrosive action consequent upon development of free sulfuric acid; although this corrosive action may be guarded against in the case of either the chlorid or the sulfate by incorporating an antacid substance such as sodium carbonate, lime, or the like, with the composition or by washing the finally coated or impregnated articles with a mildly alkaline solution of any appropriate character. Neither is the invention restricted in its broader aspects to the use of antimony salts, although antimony salts, and antimony chlorid especially, give, in practice, results which are markedly superior even to those of such other metal compounds as react with water in a somewhat similar manner.

Certain matter disclosed but not claimed herein forms the subject matter of divisional applications Serial Nos. 441,082 and 441,084, filed January 29, 1921.

What I claim is:

1. The process of preparing tarry substances for use as protective materials, which comprises incorporating therewith a suitable proportion of a fire-retardant metal compound which is soluble therein or miscible therewith to form a homogeneous product, said compound having the property of decomposing substantially immediately upon contact with water to yield a water-insoluble product.

2. The process of preparing tarry substances for use as protective materials, which comprises incorporating therewith a salt of antimony that is substantially immediately decomposed upon contact with water.

3. The process of preparing tarry substances for use as protective materials, which comprises incorporating therewith antimony trichlorid.

4. The process of preparing tarry substances for use as protective materials which comprises incorporating with such tarry substances a fire-retardant hydrolyzable compound of antimony.

5. The process of treating creosote to render the same less inflammable, which comprises directly dissolving therein antimony trichlorid in the approximate proportion of about two pounds of antimony trichlorid to one gallon of creosote.

6. The process of preparing tarry substances for use as protective materials, which comprises incorporating antimony trichlorid, with tarry material in fluid condition.

7. The process of preparing tarry substances for use as protective materials, which comprises incorporating antimony trichlorid with tarry material in fluid condition, in the proportion of about 1 part of antimony trichlorid by weight to from 4 to 5 parts of such tarry material by weight.

8. A tarry mixture suitable for use as a protective material comprising a suitable solvent and a fire-retardant metal compound which is soluble therein or miscible therewith to form a homogeneous product, said compound having the property of decomposing substantially immediately upon contact with water to yield a water-insoluble product.

9. A tarry mixture suitable for use as a protective material comprising a salt of antimony that is substantially immediately decomposed upon contact with water.

10. A tarry mixture suitable for use as a protective material comprising antimony trichlorid.

11. A tarry substance suitable for use as a protective material comprising an admixture of tarry material with a solution of a fire-retardant hydrolyzable compound of antimony.

12. A tarry substance suitable for use as a protective material comprising antimony trichlorid in the approximate proportion of two pounds of antimony trichlorid to one gallon of the tarry material.

13. A protective composition comprising a tarry material in fluid condition having antimony trichlorid incorporated therewith.

14. A protective composition comprising antimony trichlorid incorporated with tarry material in fluid condition in the proportion of about one part of antimony trichlorid to from four or five parts of said tarry material by weight.

15. A protective composition comprising creosote having antimony chlorid incorporated therewith.

16. A protective composition comprising a strong solution of anhydrous antimony trichlorid in creosote.

In testimony whereof I hereunto affix my signature.

ARTHUR ARENT.